May 29, 1923.

D. H. WEYANDT

AUTOMOBILE RADIATOR

Filed May 4, 1921

1,457,202

Inventor
D. H. Weyandt,
Attorney

Patented May 29, 1923.

1,457,202

UNITED STATES PATENT OFFICE.

DAVID H. WEYANDT, OF SIDMAN, PENNSYLVANIA.

AUTOMOBILE RADIATOR.

Application filed May 4, 1921. Serial No. 466,813.

*To all whom it may concern:*

Be it known that DAVID H. WEYANDT, a citizen of the United States of America, residing at Sidman, in the county of Cambria and State of Pennsylvania, has invented new and useful Improvements in Automobile Radiators, of which the following is a specification.

The object of the invention is to provide a simple, inexpensive and efficient radiator for automobiles and similar vehicles whereby the cleaning and repair thereof or the replacement of parts necessitated by deterioration through rust or injury by collision or otherwise may readily be effected; and with these objects in view the invention consists in a construction and combination of parts of which a preferred embodiment is shown in the accompanying drawings, wherein:—

Figure 1:
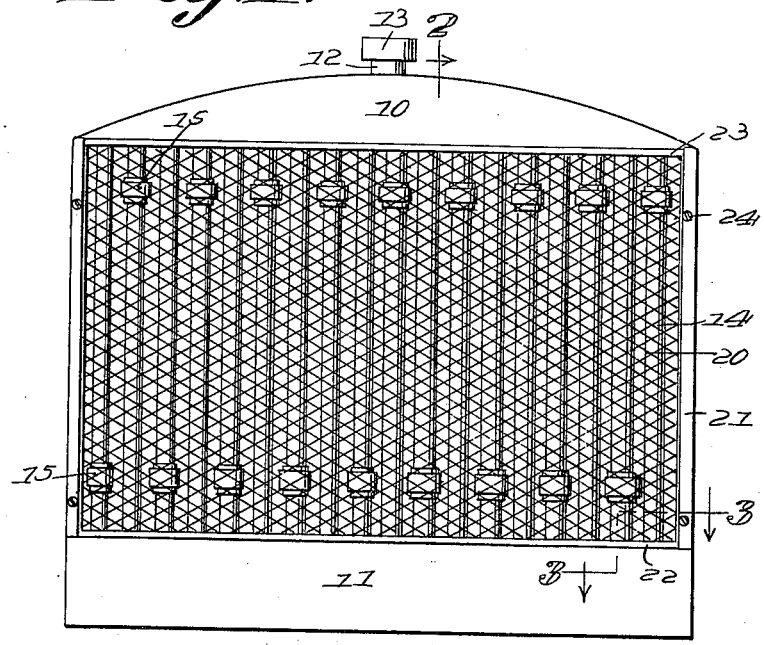
Figure 1 is a front view of a radiator constructed in accordance with the invention.

The radiator which is adapted as in the ordinary practice for arrangement at the front end of the hood of an automobile or like car or vehicle consists essentially of the upper and lower tanks or reservoirs 10 and 11 of which the former is equipped with a suitable filling tube 12 having a removable cap 13, connected by circulating elements 14 consisting of tubes which are joined and are provided with couplings 15 to facilitate the introduction and removal thereof. In the construction of circulating elements illustrated in Figures 1 and 2 the sections 14ª of each element are seated at their remote ends in seats 16 in the inner walls of the tanks 10 and 11 and are connected at their inner ends by the sleeve of the coupling having right and left couplings for respectively engaging the extremities of the tube sections, so that by turning the sleeve in one direction the tube is extended while rotation in the opposite direction will contract the tube to remove the remote extremities thereof from engagement with the seats.

Figures 2, 3, 4:
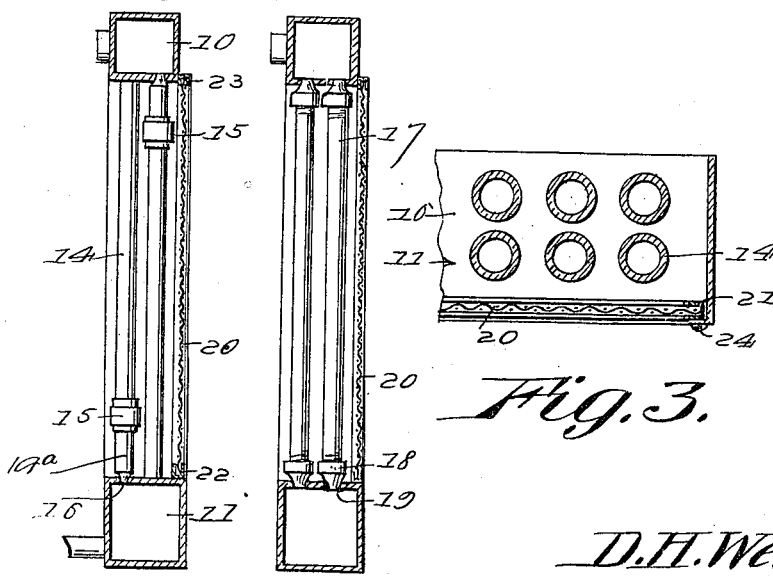
Figure 2 is a vertical sectional view of the same on the plane indicated by the line 2—2 of Figure 1.
Figure 3 is a detail transverse section on the plane indicated by the line 3—3 of Figure 1.
Figure 4 is a section similar to Figure 2 showing a slightly modified construction of the radiator elements.

In the modified construction illustrated in Figure 4 the circulating tubes 17 are provided with coupling members 18 located at the terminals thereof and consisting of nipples threaded upon the extremities of the tubes and fitted in seats 19 in the inner walls of the tanks.

In both the constructions shown in Figure 2 and Figure 4 water tight connection of the tubes with the reservoir is effected by the rotation of the couplings relative to the tubes, thereby extending the length of the latter and bringing the sections 14ª in Figure 2 and the couplings 18 in Figure 4 into firm bearing engagement with their respective seats.

It will be understood that a broken, bent or otherwise injured element of the circulating system may readily be removed and repaired or replaced, and that the elements may be displaced for cleansing purposes when required.

Spanning the space between the upper and lower tanks 10 and 11 and in front of the group of circulating elements there is arranged a screen 20, suitably bound or reinforced at its edges and engaged with side and bottom guides 21 and 22, said screen being adapted for removal through a guide slot 22 supported by the upper tank in the plane of and communicating with the side guides, to the end that when access to the circulating tube is required the screen may be displaced. The screen is adapted to be locked in position in the guides by means of set-screws 24 intersecting said guides.

Having described the invention, what is claimed as new and useful is:—

A radiator for automobiles having upper and lower tanks, and upright tubular circulating elements connecting said tanks, the tanks being formed with seats for the extremities of the tubular elements and the latter being of sectional construction with the elements connected by couplings the rotation of which extends the effective lengths of the elements to bring the extremities into firm engagement with said seats.

In testimony whereof he affixes his signature.

DAVID H. WEYANDT.